US012676732B2

(12) United States Patent
Shin

(10) Patent No.: US 12,676,732 B2
(45) Date of Patent: Jul. 7, 2026

(54) ELECTRONIC DEVICE FOR GENERATING AND AUTHENTICATING IDENTIFICATION INFORMATION OF HARDWARE DEVICE, AND OPERATION METHOD THEREOF

(71) Applicant: ICTK Holdings Co., Ltd., Seongnam-si (KR)

(72) Inventor: Kwang Cho Shin, Seoul (KR)

(73) Assignee: ICTK Holdings Co., Ltd., Seongnam-si (KR)

( * ) Notice: Subject to any disclaimer, the term of this patent is extended or adjusted under 35 U.S.C. 154(b) by 378 days.

(21) Appl. No.: 18/029,712

(22) PCT Filed: Jul. 30, 2021

(86) PCT No.: PCT/KR2021/009962
§ 371 (c)(1),
(2) Date: Mar. 31, 2023

(87) PCT Pub. No.: WO2022/075563
PCT Pub. Date: Apr. 14, 2022

(65) Prior Publication Data
US 2023/0275749 A1 Aug. 31, 2023

(30) Foreign Application Priority Data
Oct. 6, 2020 (KR) ........................ 10-2020-0128757

(51) Int. Cl.
*H04L 9/08* (2006.01)
*G06F 21/73* (2013.01)
*H04L 9/32* (2006.01)

(52) U.S. Cl.
CPC ............ *H04L 9/0825* (2013.01); *G06F 21/73* (2013.01); *H04L 9/3268* (2013.01)

(58) Field of Classification Search
CPC ... H04L 9/0825; H04L 9/3268; H04L 9/3247; H04L 9/3263; H04L 9/0866; G06F 21/73; G06F 21/44; G06F 21/33
See application file for complete search history.

(56) References Cited

U.S. PATENT DOCUMENTS 10,511,447 B1 * 12/2019 Lakk ..................... H04L 9/3297
2014/0095886 A1 4/2014 Futral
(Continued)

FOREIGN PATENT DOCUMENTS

KR 10-2013-0129334 11/2013
KR 10-2015-0080579 7/2015
(Continued)

OTHER PUBLICATIONS

Supplementary European Search Report and the European Search Opinion Dated Oct. 9, 2024 From the European Patent Office Re. Application No. 21877818.1. (9 Pages).
(Continued)

*Primary Examiner* — Hany S. Gadalla

(57) ABSTRACT
An electronic device which generates and authenticates identification information of a hardware device and an operation method thereof are disclosed. The operation method of the disclosed electronic device includes determining identification information used for authentication of a hardware device using a public key of the hardware device generated from a private key of the hardware device, and managing the identification information.

16 Claims, 4 Drawing Sheets

(56)                  References Cited

U.S. PATENT DOCUMENTS

| 2014/0108786 A1* | 4/2014 | Kreft ................. G06Q 20/3825 |
| | | 713/194 |
| 2019/0319798 A1* | 10/2019 | Chalkias ............... H04L 9/3236 |
| 2021/0067349 A1* | 3/2021 | Kruegel ............... H04L 9/3268 |
| 2022/0256349 A1* | 8/2022 | Ståhl .................... H04W 12/72 |

FOREIGN PATENT DOCUMENTS

| KR | 10-1599995 | 3/2016 |
| KR | 10-2017-0087678 | 7/2017 |
| KR | 10-2019-0002388 | 1/2019 |
| WO | WO 2014/105310 | 7/2014 |

OTHER PUBLICATIONS

Antonopoulos "Mastering Bitcoin—Unlocking Digital Cryptocur-rencies", O'Reilly Media, XP055306939, 298 P., Dec. 20, 2014.
International Search Report and the Written Opinion Dated Jan. 11, 2022 From the International Searching Authority Re. Application No. PCT/KR2021/009962 and Its Translation Into English. (14 Pages).

* cited by examiner

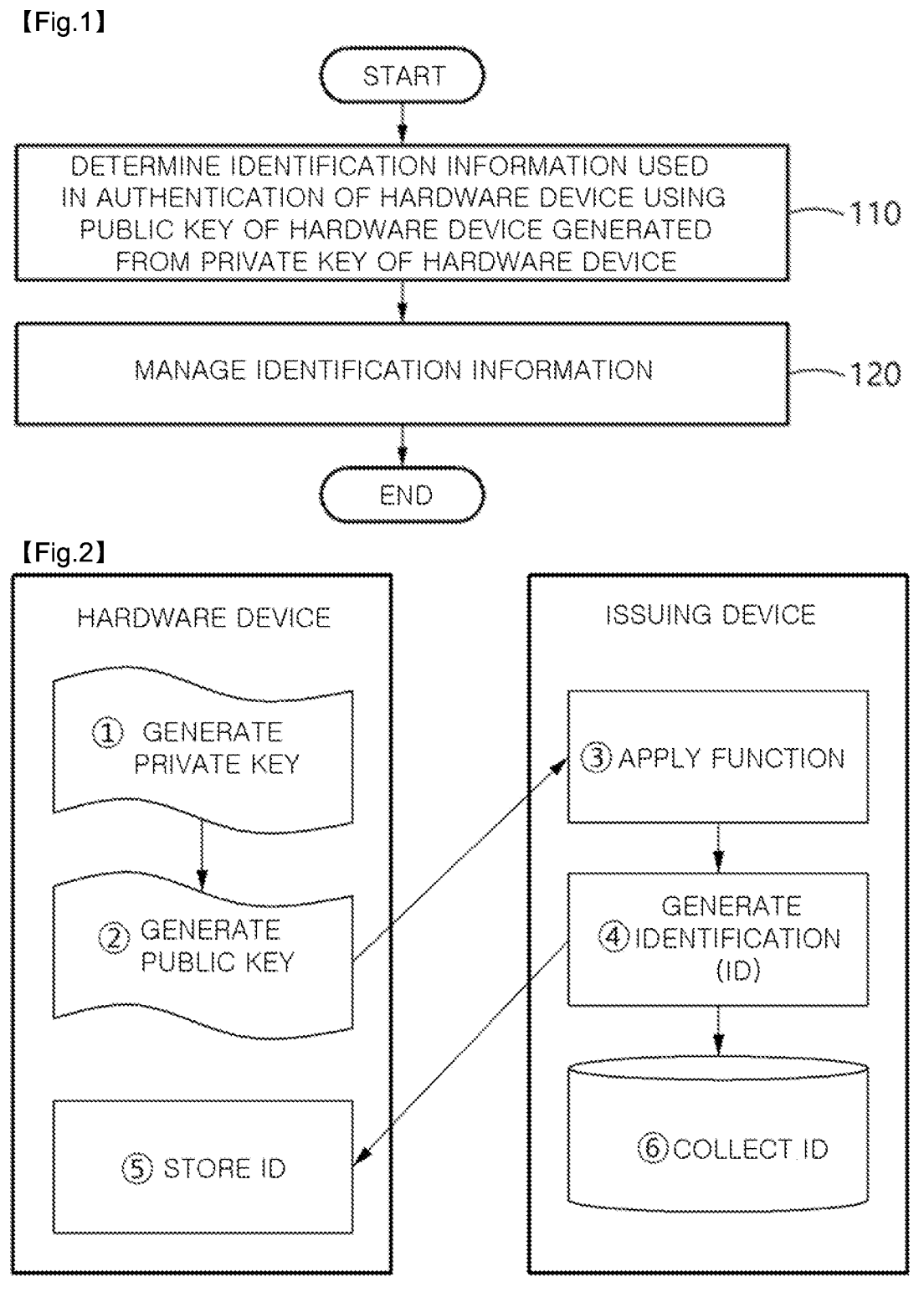

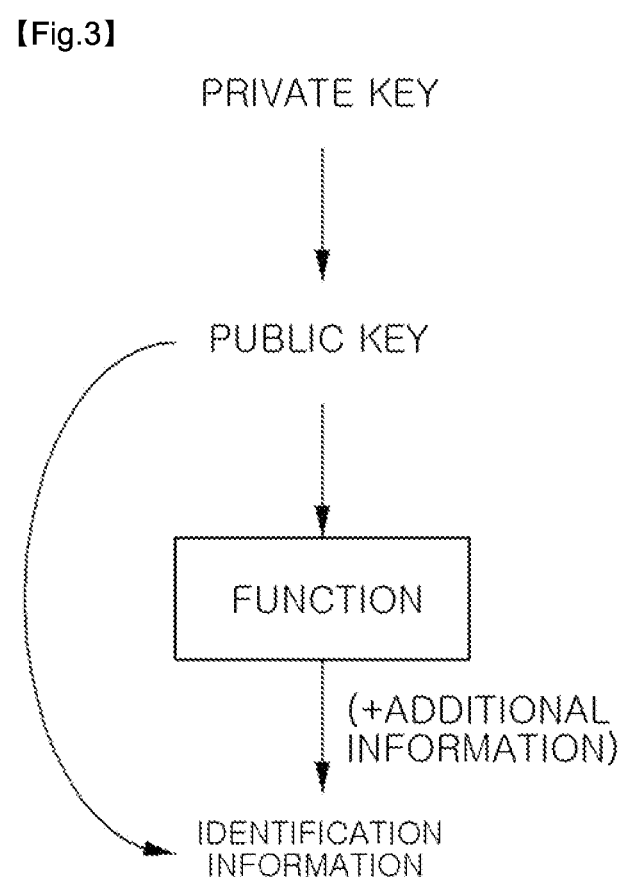

PRIVATE KEY

PUBLIC KEY

FUNCTION (+ADDITIONAL
INFORMATION)

IDENTIFICATION
INFORMATION

【Fig.4】
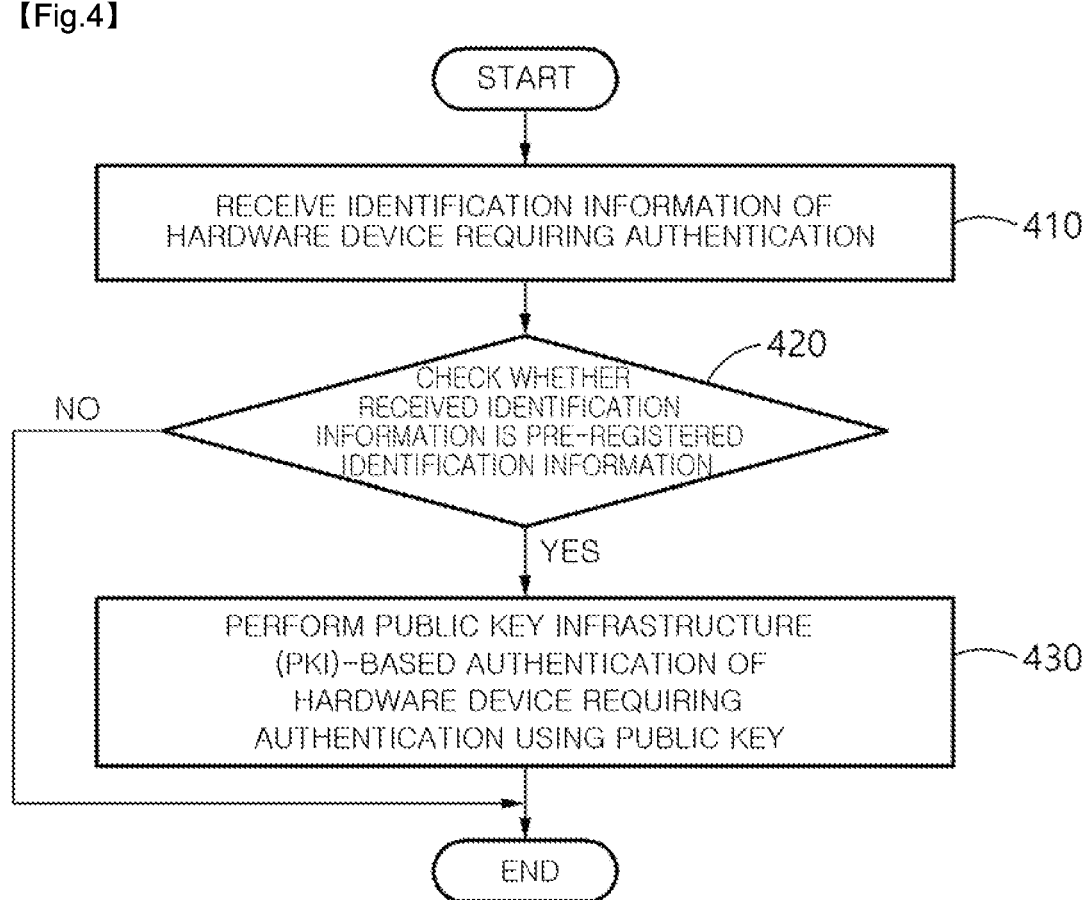

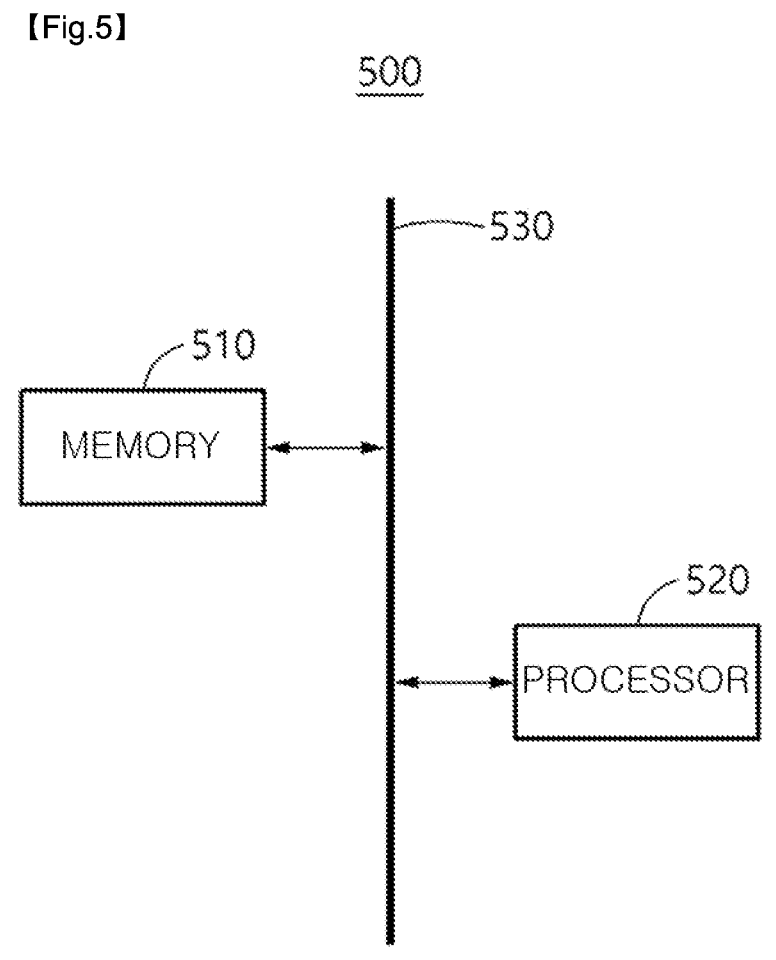

ELECTRONIC DEVICE FOR GENERATING AND AUTHENTICATING IDENTIFICATION INFORMATION OF HARDWARE DEVICE, AND OPERATION METHOD THEREOF

RELATED APPLICATIONS

This application is a National Phase of PCT Patent Application No. PCT/KR2021/009962 having International filing date of Jul. 30, 2021, which claims the benefit of priority of Korea Patent Application No. 10-2020-0128757 filed on Oct. 6, 2020. The contents of the above applications are all incorporated by reference as if fully set forth herein in their entirety.

FIELD AND BACKGROUND OF THE INVENTION

The following description relates to an electronic device which generates and authenticates identification information of a hardware device and an operation method thereof, and more specifically, a method and device for generating identification information of a hardware device including a chip, a module, and a device which perform a security function, and performing authentication based on this.

At stages of producing, selling, and using hardware devices such as a chip, a module, a device, and the like, identification information such as a unique identification (ID) is required to track and manage the corresponding hardware devices. Generally, identification information is information generated for management purposes, and the generated identification information can be stored and managed in a server.

When a hardware device having a public key infrastructure (PKI) function performs a security function through its private key, legitimacy should be verified by receiving an authentication certificate from a certificate authority (CA) server. Generally, an authentication certificate is issued by combining an ID of the hardware device and a public key and signing with a secret key of the CA server.

However, in order to implement this, an agreement with an operator of an existing CA server is required to directly operate the CA server by additionally building the CA server in a production facility of the hardware device, or to receive an authentication certificate by accessing a remote CA server, and this series of processes can be regarded as considerable costs and difficulties for manufacturers or distributors of hardware devices.

SUMMARY OF THE INVENTION

An operation method of an electronic device according to one embodiment includes: determining identification information used for authentication of a hardware device using a public key of the hardware device generated from a private key of the hardware device; and managing the identification information.

In the operation method of the electronic device according to one embodiment, in the determining of the identification information, the identification information may be determined based on the public key or a value acquired by applying a predetermined function to the public key.

In the operation method of the electronic device according to one embodiment, the function may correspond to a cryptographic hash algorithm for determining data of a predetermined length from the public key, a cryptographic algorithm for encrypting the public key, a function using a portion of the public key, or a combination thereof.

In the operation method of the electronic device according to one embodiment, in the determining of the identification information, the identification information may be determined further using information on at least one of producer identification information, product identification information, a production date, and a production location of the hardware device.

In the operation method of the electronic device according to one embodiment, the hardware device may be any one of a chip, a module, and a device to be authenticated.

The operation method of the electronic device according to one embodiment may further include: checking whether the identification information of the corresponding hardware device received from a hardware device requiring authentication is pre-registered identification information; and performing public key infrastructure (PKI)-based authentication of the hardware device requiring authentication in response to a case in which the received identification information is the pre-registered identification information using a public key acquired from the received identification information or a public key received from the hardware device requiring authentication.

In the operation method of the electronic device according to one embodiment, in the performing of the PKI-based authentication, the PKI-based authentication may be performed using the acquired public key or the received public key without an authentication certificate issued by a certificate authority (CA) server.

In the operation method of the electronic device according to one embodiment, in the performing of the PKI-based authentication, the PKI-based authentication may be performed based on whether a PKI signature for a random value generated by the electronic device is able to be generated using the acquired public key or the received public key.

In the operation method of the electronic device according to one embodiment, in the performing of the PKI-based authentication, the PKI-based authentication may be performed based on whether the hardware device requiring authentication is able to decrypt data encrypted based on the acquired public key.

In the operation method of the electronic device according to one embodiment, in the performing of the PKI-based authentication, the PKI-based authentication may be performed based on whether PKI-based session generation succeeds using the acquired public key or the received public key.

In the operation method of the electronic device according to one embodiment, in the performing of the PKI-based authentication, the PKI-based authentication may be performed based on whether a signature of a signature document received from the hardware device requiring authentication is able to be verified with the acquired public key.

In the operation method of the electronic device according to one embodiment, in the performing of the PKI-based authentication, the authentication may be performed based on whether the identification information acquired from the received public key corresponds to the received identification information in response to a case in which the public key is not able to be effectively generated from the received identification information.

An operation method of an electronic device according to one embodiment includes: receiving identification information of a corresponding hardware device from a hardware device requiring authentication; checking whether the received identification information is pre-registered identification information; and performing PKI-based authentication of the hardware device requiring authentication in response to a case in which the received identification information is the pre-registered identification information using a public key acquired from the received identification information or a public key received from the hardware device requiring authentication without an authentication certificate issued by a CA server.

An electronic device according to one embodiment includes: a processor; and a memory including at least one instruction executable by the processor, wherein the processor determines identification information used for authentication of a hardware device and manages the identification information using a public key of the hardware device generated from a private key of the hardware device when the at least one instruction is executed by the processor.

In the electronic device according to one embodiment, the processor may determine the identification information based on the public key or a value acquired by applying a predetermined function to the public key.

In the electronic device according to one embodiment, the function may correspond to a cryptographic hash algorithm for determining data of a predetermined length from the public key, a cryptographic algorithm for encrypting the public key, a function using a portion of the public key, or a combination thereof.

In the electronic device according to one embodiment, the processor may determine the identification information further using information on at least one of producer identification information, product identification information, a production date, and a production location of the hardware device.

In the electronic device according to one embodiment, the hardware device may be any one of a chip, a module, and a device to be authenticated.

In the electronic device according to one embodiment, the processor may check whether the identification information of the corresponding hardware device received from the hardware device requiring authentication is pre-registered identification information, and may perform PKI-based authentication of the hardware device requiring authentication in response to a case in which the received identification information corresponds to the pre-registered identification information using a public key acquired from the received identification information or a public key received from the hardware device requiring authentication.

According to one embodiment, as identification information is generated based on a public key of a hardware device without receiving an authentication certificate from a certificate authority (CA) server, the integrity of hardware can be effectively verified even through a relatively simple system. Since the identification information is generated based on a public key disclosed to the outside, exposure of the identification information itself to the outside can be irrelevant in terms of security.

According to one embodiment, as identification information is generated from the public key of the corresponding hardware device without issue of the authentication certificate from the CA server, identification information, capable of effectively verifying the integrity of the hardware device while preventing the difficulty, of directly operating the CA server or acquiring an authentication certificate by remotely accessing an existing CA server, or generation of costs can be acquired. Further, since heavy data processing based on the authentication certificate is not necessary, the integrity of the hardware device can be effectively verified only with relatively light security processing.

According to one embodiment, in the case in which an identification (ID) is extracted and stored for management purposes, descriptions in the present specification can be applied as is while omitting only a process of issuing an authentication certificate even in an existing system in which an authentication certificate is issued and used.

BRIEF DESCRIPTION OF THE SEVERAL VIEWS OF THE DRAWINGS

FIGS. 1, 2 and 3 are views for describing a process of issuing identification information according to one embodiment.

FIG. 4 is a view for describing a process of authenticating a hardware device based on the identification information according to one embodiment.

FIG. 5 is a view for describing an electronic device according to one embodiment.

DESCRIPTION OF SPECIFIC EMBODIMENTS OF THE INVENTION

Specific structural or functional descriptions of embodiments are disclosed for illustrative purposes only, and may be changed and implemented in various forms. Accordingly, an actually implemented form is not limited only to the specific disclosed embodiments, and the scope of the present specification includes changes, equivalents, or substitutes included in the technical spirit described in the embodiments.

Although terms such as 'first' and 'second' may be used to describe various components, these terms may be used only for the purpose of distinguishing one component from another. For example, a "first component" may be referred to as a "second component," and similarly, a "second component" may also be referred to as a "first component."

When a certain component is mentioned as being "connected" to another component, it should be understood that the certain component may be directly connected or linked to the other component, but still another component may also be present therebetween.

A singular form also includes a plural form, unless the context clearly indicates otherwise. Further, it should be further understood that the terms "include," "including," or "have," "having" specify the presence of stated features, integers, steps, operations, elements, parts, and/or a combination thereof but do not preclude the presence or addition of one or more other features, integers, steps, operations, elements, parts, and/or a combination thereof.

Unless otherwise defined, all terms used herein, including technical or scientific terms, have the same meaning as generally understood by those skilled in the art. Terms such as terms defined in generally used dictionaries should be interpreted as having meanings consistent with the meanings in the context of the related art, and should not be interpreted in an idealistic or excessively formal sense unless otherwise defined in the present specification.

Hereinafter, the embodiments will be described in detail with reference to the accompanying drawings. In the description with reference to the accompanying drawings, the same reference numerals are given to the same components regardless of the drawing numerals, and overlapping descriptions thereof will be omitted.

FIGS. 1 to 3 are views for describing a process of issuing identification information according to one embodiment.

Referring to FIG. 1, a method of determining and managing identification information through control of a processor provided in an electronic device according to one embodiment is shown.

In operation 110, the electronic device determines identification information used in authentication of a hardware device using a public key of the hardware device generated from a private key of the hardware device. The identification information is information uniquely given so that the corresponding hardware device may be distinguished from other hardware devices, and a process of generating the identification information will be described in detail with reference to FIGS. 2 and 3.

The hardware device is a device requiring integrity verification when used by the corresponding user after being produced and sold to a user, and may include, for example, a chip, a module, a device, and the like. Here, the chip or module may refer to a component which is included in a device corresponding to a finished product and responsible for a predetermined function. The devices may include, for example, various computing devices such as a smart phone, a tablet, a laptop, a personal computer, and the like, various wearable devices such as a smart watch, smart glasses, smart clothing, and the like, various home appliances such as a smart speaker, a smart TV, a smart refrigerator, and the like, a smart vehicle, a smart kiosk, an Internet of Things (IoT) device, a walking assist device (WAD), a drone, a robot, and the like.

As will be described below in detail, as identification information is generated from the public key of the hardware device without issue of the authentication certificate from a certificate authority (CA) server, identification information capable of effectively verifying the integrity of the hardware device while preventing the difficulty, of directly operating the CA server or acquiring an authentication certificate by remotely accessing an existing CA server, or generation of costs may be acquired. Further, since heavy data processing based on the authentication certificate is not necessary, the integrity of the hardware device may be effectively verified only with relatively light security processing.

The electronic device which generates this identification information may be an issuing device, which generates identification information by extracting a public key and the like from a hardware device, or hardware itself, but the embodiment is not limited thereto. Here, the issuing device may be a device provided in a facility which produces a hardware device to issue the identification information of the corresponding device whenever a hardware device is produced in the facility, but the embodiment of the issuing device is not limited thereto.

In operation 120, the electronic device manages the identification information. For example, when the electronic device is the issuing device, identification information for each of several hardware devices may be determined and managed with a list. When the electronic device is hardware itself, various pieces of identification information may be managed together by storing the identification information thereof internally and transmitting the identification information to an external database.

In one embodiment, as an entity (for example, a chip or module producer) that has collected pieces of identification information transmits an identification information list to another entity (for example, a person who receives a chip or module and produces a device or the like), a subject who performs an authentication process to be described later may be changed. The entity which receives the identification information list may transfer the corresponding list to another entity.

When an event such as loss, theft, disposal, or the like of a specific hardware device occurs, a case in which the corresponding hardware device is used without permission or stolen may be effectively prevented by deleting the identification information of the hardware device from the identification information list or adding the identification information to a discard list and separately managing the identification information.

Hereinafter, for convenience of description, an example in which identification information is determined by an issuing device will be described, but since the following description may be equally applied to an example in which identification information is determined in a hardware device, a more detailed description will be omitted.

Referring to FIG. 2, a block diagram for describing an operation between the hardware device and the issuing device according to one embodiment is shown.

First, the hardware device may determine a secret key thereof. For example, the hardware device may generate a secret key based on a physical unclonable function (PUF) value or may generate a secret key based on a random value generated by a random number generator (RNG). However, an example of generating a secret key is not limited, and the description of the present specification may be applied to other methods capable of generating the secret key.

Also, the hardware device may generate a public key from a private key based on a public key infrastructure (PKI). The hardware device may transmit the public key to the issuing device for generation of the identification information. In the present specification, the identification information may also be referred to as an ID for convenience of description.

The issuing device may use the public key of the hardware device to generate the ID of the corresponding hardware device, and in this case, a function may be additionally used.

In a detailed description of generation of the identification key with reference to FIG. 3, the identification information may be determined based on the public key or a value acquired by applying a predetermined function to the public key. Even when the identification information is determined using the public key without applying a function, all or part of the public key may be used to determine the identification information.

Further, the function may correspond to a cryptographic hash algorithm which determines data of a predetermined length from the public key, a cryptographic algorithm which encrypts the public key, a function using a portion of the public key, or a combination thereof. When the public key is too long (for example, when Rivest Shamir Adleman (RSA) or post quantum cryptography (PQC) is used or the like), a cryptographic hash algorithm capable of reducing the public key to data of a predetermined length may be applied to an identification key as a function to acquire identification information of a relatively short length. Alternatively, the identification information may be determined based on a value acquired by applying an encryption algorithm to the public key, trimming a portion of the public key, or applying an exclusive OR (XOR) operation to the public key. In some cases, the identification information may be determined by applying a combination of two or more of the aforementioned functions to the public key. Further, the entire public key may be input to the function, but depending on the embodiment, only a portion of the public key may be input to the function, or a result of adding another specific value to the public key may be input to the function.

Further, when the identification information is determined based on the public key or the value acquired by applying a function to the public key, additional information may be additionally considered. For example, the additional information may include information on at least one of producer identification information, product identification information, a production date, and a production location of the hardware device. In other words, fixed information commonly possessed by a plurality of hardware devices generated together, such as information on producer identification information, product identification information, production date, and production location information, as well as pieces of individual information different for each hardware device, such as a public key or a value acquired by applying a function to the public key, may also be used to generate identification information.

Referring to FIG. 2 again, the generated ID may be collected and stored in a database by the issuing device and managed with an identification information list. The identification information list may be used by an authentication server to authenticate the integrity of the hardware device later.

Further, the generated ID may be transmitted to and stored in the hardware device.

FIG. 4 is a view for describing a process of authenticating a hardware device based on the identification information according to one embodiment.

Referring to FIG. 4, a method of authenticating a hardware device through control of the processor provided in the electronic device according to one embodiment is illustrated.

When the hardware device is produced and sold to a user, the corresponding user may access a service server providing the corresponding service for using a service based on the hardware device. The service server may verify the integrity or validity of the accessed hardware device to provide the service only to users who have purchased hardware devices actually produced in an official production facility. In this case, the identification information generated in the above-described manner may be used. Although described in detail later, since an authentication certificate issued by a CA server is not required for verification of such integrity or validity, verification may be easily performed at relatively low costs and with a simple verification method. In the present specification, the service server which verifies the integrity or validity of the hardware device may also be referred to as an authentication server for convenience of description.

When a chip corresponding to a hardware device (for example, a system on chip (SoC) or the like) is produced by a chip manufacturer and delivered to a device manufacturer, as the chip manufacturer may also transmit the identification information list for the hardware devices to be delivered to the device manufacturer, the device manufacturer may easily check the authenticity of the chip through the identification information list. Further, after a device is manufactured using a chip and sold to a user, the device manufacturer may easily check the authenticity of the device through the identification information of the device as well as the authenticity of the chip through the identification information of the chip when the corresponding user accesses a server operated by the device manufacturer through the device, and may provide a service thereof only to a device with an integrity-verified chip or a device whose integrity has been verified.

Hereinafter, a method of authenticating a hardware device will be described in detail, and a service server or an authentication server which performs an authentication operation may also be referred to as an electronic device.

In operation 410, the electronic device receives the identification information of the corresponding hardware device from the hardware device requiring authentication.

In operation 420, the electronic device checks whether the received identification information is pre-registered identification information. The electronic device may check whether the identification information received from the hardware device is identification information pre-registered in the list. Alternatively, the electronic device may check whether the identification information received from the hardware device is identification information registered in a discard list. When the received identification information does not correspond to identification information pre-registered in a valid list, the electronic device may reject the authentication of the hardware device and end operation. On the other hand, when the received identification information corresponds to the identification information pre-registered in the valid list, operation 430 may be performed thereafter.

In operation 430, the electronic device performs PKI-based authentication of the hardware device requiring authentication using the public key acquired from the received identification information or the public key received from the hardware device requiring authentication. Since an authentication certificate issued by a CA server is not used in this PKI-based authentication, a process of receiving an authentication certificate from a CA server is not required. The public key may be acquired from the identification information by applying the above-described method of determining the identification information from the public key in reverse.

When the public key is not entirely included in the identification information and thus it is difficult to generate an entire public key from the identification information, the identification information may be generated by applying the same method to the public key received from the hardware device, and authentication may be performed according to whether the generated identification information matches the identification information received in operation 410. Specifically, when a hash algorithm is applied, the validity of the public key may be more clearly confirmed by the characteristics of the hash algorithm.

For example, PKI-based authentication may be performed based on whether a PKI signature for a random value generated by the electronic device is able to be generated using the acquired public key or the received public key.

Further, PKI-based authentication may be performed based on whether the hardware is able to decrypt data encrypted based on the acquired public key. There is an authentication method using the characteristic that the corresponding hardware device does not have a legitimate private key, and thus the encrypted data cannot be decrypted by the public key acquired from the identification information when authentication of the hardware device is attempted by stealing valid identification information.

Further, PKI-based authentication may be performed based on whether PKI-based session generation succeeds using the acquired public key or the received public key.

In addition, PKI-based authentication may be performed based on whether the signature of the signature document received from the hardware device is able to be verified with the acquired public key. When authentication of the hardware device is attempted by stealing valid identification information, since the corresponding hardware device does not have a legitimate private key, a signature document signed with a legitimate private key cannot be generated.

Accordingly, the signature of the signature document received from the hardware device may not be verified with the acquired public key, and there is an authentication method using this characteristic.

FIG. 5 is a view for describing an electronic device according to one embodiment.

Referring to FIG. 5, an electronic device 500 according to one embodiment includes a memory 510 and a processor 520. The memory 510 and the processor 520 may communicate with each other through a bus 530. In FIG. 5, a communication unit which performs communication with other devices through a wired network and/or wireless network may be omitted. The electronic device 500 may be implemented as the above-described hardware device, issuing device, service server, or authentication server.

The memory 510 may include computer-readable instructions. The processor 520 may perform the above-mentioned operations as the instructions stored in the memory 510 are executed by the processor 520. The memory 510 may be a volatile memory or non-volatile memory.

The processor 520 is a device which executes the instructions or programs or controls the electronic device 500, and may include, for example, a central processing unit (CPU), a graphics processing unit (GPU), and the like.

When the electronic device 500 is implemented as the hardware device or issuing device, the processor 520 determines the identification information used for the authentication of the hardware device using the public key of the hardware device generated from the private key of the hardware device, and manages the identification information.

When the electronic device 500 is implemented as the service server or authentication server, the processor 520 receives the identification information of the corresponding hardware device from the hardware device requiring authentication, checks whether the received identification information is pre-registered identification information, and performs PKI-based authentication of the hardware device requiring authentication in response to a case in which the received identification information corresponds to the pre-registered identification information using the public key acquired from the received identification information or the public key received from the hardware device requiring authentication without an authentication certificate issued by a CA server.

In the embodiments, when security for purposes of authentication, tracking, and the like is required in existing chips, modules, and devices, as an ID is generated based on a public key to solve the inconvenience of receiving an authentication certificate from a CA server and using the authentication certificate, costs or efforts for proving validity of the chips, modules, and devices may be effectively reduced. Specifically, in the case in which an ID is extracted and stored for management purposes, descriptions in the present specification may be applied as is while omitting only a process of issuing an authentication certificate even in an existing system in which an authentication certificate is issued and used.

In addition, the above-described operation related to the electronic device 500 may be processed.

The above-described embodiments may be implemented as hardware components, software components, and/or a combination of the hardware components and the software components. For example, the devices, methods, and components described in the embodiments may be implemented using a general purpose computer or a special purpose computer such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing unit may execute an operating system (OS) and a software application running on the operating system. Further, the processing unit may also access, store, manipulate, process, and generate data in response to execution of the software. For convenience of understanding, there is a case in which one processing unit is used, but those skilled in the art may know that the processing unit includes a plurality of processing elements and/or a plurality of types of processing elements. For example, the processing unit may include a plurality of processors or one processor and one controller. Other processing configurations such as parallel processors are also possible.

The software may include a computer program, code, instructions, or a combination of one or more thereof, and may configure a processing unit to operate as desired, or command the processing unit independently or collectively. In order to be interpreted by a processing unit or provide the instructions or data to the processing unit, the software and/or data may be permanently or temporarily embodied in any type of machine, component, physical device, virtual equipment, computer storage medium or device, or signal wave being transmitted. The software may be distributed on computer systems connected through a network, and stored or executed in a distributed manner. The software and the data may be stored on a computer-readable medium.

The method according to the embodiment may be implemented in the form of program instructions which may be executed through various computer means and may be recorded on a computer-readable medium. The computer-readable medium may include program instructions, data files, data structures, or the like alone or in combination, and the program instructions recorded on the medium may be specifically designed and configured for the embodiments or may be known and usable to those skilled in the art of computer software. Examples of computer-readable recording media include magnetic media such as a hard disk, a floppy disk, and a magnetic tape, optical media such as a compact disc read-only memory (CD-ROM) and a digital versatile disc (DVD), and a magneto-optical medium such as a floptical disk, and hardware devices specially configured to store and execute program instructions, such as a ROM, a random-access memory (RAM), a flash memory, and the like. Examples of the program instructions include high-level language code which may be executed by a computer using an interpreter or the like as well as machine language code produced by a compiler.

The above-described hardware device may be configured to operate as one software module or a plurality of software modules to perform the operations of the embodiments, and vice versa.

As described above, although the embodiments have been described with limited drawings, those skilled in the art may apply various technical changes and modifications based on the above. For example, the described techniques may be performed in an order different from the described method, and/or components of the described system, structure, device, circuit, and the like may be coupled or combined in a form different from the described method, or may achieve appropriate results even when replaced or substituted by other components or equivalents.

Accordingly, other implementations, other embodiments, and equivalents of the claims belong to the scope of the following claims.

The invention claimed is:

1. An operation method of an electronic device, comprising:

determining identification information used for authentication of a hardware device using a public key of the hardware device generated from a private key of the hardware device; and managing the identification information;

receiving, from the hardware device requiring authentication, identification information of the hardware device;

checking whether the received identification information is pre-registered identification information, wherein the electronic device checks whether the received identification information corresponds to identification information pre-registered in a valid list;

when the received identification information does not correspond to identification information pre-registered in the valid list, rejecting authentication of the hardware device and ending operation; and when the received identification information corresponds to the identification information pre-registered in the valid list, performing, thereafter, public key infrastructure (PKI)-based authentication of the hardware device requiring authentication in response to a case in which the received identification information is the pre-registered identification information using a public key acquired from the received identification information or a public key received from the hardware device requiring authentication, wherein, in the performing of the PKI-based authentication, the PKI-based authentication is performed using the acquired public key or the received public key without an authentication certificate issued by a certificate authority (CA) server; and rejecting authentication of the hardware device in response to the identification information not being the pre-registered identification information.

2. The operation method of claim 1, wherein, in the determining of the identification information, the identification information is determined based on the public key or a value acquired by applying a predetermined function to the public key.

3. The operation method of claim 2, wherein the function corresponds to a cryptographic hash algorithm for determining data of a predetermined length from the public key, a cryptographic algorithm for encrypting the public key, a function using a portion of the public key, or a combination thereof.

4. The operation method of claim 1, wherein, in the determining of the identification information, the identification information is determined further using information on at least one of producer identification information, product identification information, a production date, and a production location of the hardware device.

5. The operation method of claim 1, wherein the hardware device is any one of a chip, a module, and a device to be authenticated.

6. The operation method of claim 1, wherein, in the performing of the PKI-based authentication, the PKI-based authentication is performed based on whether a PKI signature for a random value generated by the electronic device is able to be generated using the acquired public key or the received public key.

7. The operation method of claim 1, wherein, in the performing of the PKI-based authentication, the PKI-based authentication is performed based on whether the hardware device requiring authentication is able to decrypt data encrypted based on the acquired public key.

8. The operation method of claim 1, wherein, in the performing of the PKI-based authentication, the PKI-based authentication is performed based on whether PKI-based session generation succeeds using the acquired public key or the received public key.

9. The operation method of claim 1, wherein, in the performing of the PKI-based authentication, the PKI-based authentication is performed based on whether a signature of a signature document received from the hardware device requiring authentication is able to be verified with the acquired public key.

10. The operation method of claim 1, wherein, in the performing of the PKI-based authentication, the authentication is performed based on whether the identification information acquired from the received public key corresponds to the received identification information in response to a case in which the public key is not able to be effectively generated from the received identification information.

11. A non-transitory computer readable storage medium in which a program for executing the method of claim 1 is recorded.

12. An electronic device comprising:

a processor; and a memory including at least one instruction executable by the processor;

wherein when the at least one instruction is executed by the processor, the processor:

determines identification information used for authentication of a hardware device, manages the identification information using a public key of the hardware device generated from a private key of the hardware device, receive, from the hardware device requiring authentication, identification information of the hardware device;

checks whether the received identification information is pre-registered identification information, wherein the processor checks whether the received identification information corresponds to identification information pre-registered in a valid list, when the received identification information does not correspond to identification information pre-registered in the valid list, rejects authentication of the hardware device and ends operation; and when the received identification information corresponds to the identification information pre-registered in the valid list, performs, thereafter, public key infrastructure (PKI)-based authentication of the hardware device requiring authentication in response to a case in which the received identification information is the pre-registered identification information using a public key acquired from the received identification information or a public key received from the hardware device requiring authentication, without using an authentication certificate issued by a certificate authority (CA) server, and rejects authentication of the hardware device in response to a case in which the received identification information is not the pre-registered identification information.

13. The electronic device of claim 12, wherein the processor determines the identification information based on the public key or a value acquired by applying a predetermined function to the public key.

14. The electronic device of claim 13, wherein the function corresponds to a cryptographic hash algorithm for determining data of a predetermined length from the public key, a cryptographic algorithm for encrypting the public key, a function using a portion of the public key, or a combination thereof.

15. The electronic device of claim 12, wherein the processor determines the identification information further using information on at least one of producer identification information, product identification information, a production date, and a production location of the hardware device.

16. The electronic device of claim 12, wherein the hardware device is any one of a chip, a module, and a device to be authenticated.

* * * * *